3,647,776
1-HYDROXY- AND ACETYLOXY-3-(1-HEXENYL-
AZOXY)-2-BUTANONE
William James McGahren, Demarest, and John Norman
Porter, Ramsey, N.J., and Joseph Daniel Korshalla,
Pearl River, N.Y., assignors to American Cyanamid
Company, Stamford, Conn.
No Drawing. Filed Apr. 2, 1969, Ser. No. 812,861
Int. Cl. A01n 9/20; C07c 105/00; C12k 1/06
U.S. Cl. 260—143  2 Claims

ABSTRACT OF THE DISCLOSURE

This disclosure describes 1-hydroxy-3-(1-hexenylazoxy)-2-butanone and 1-acetyloxy-3-(1-hexenylazoxy)-2-butanone, compounds useful as antifungal agents.

BRIEF SUMMARY OF THE INVENTION

This invention relates to new antifungal compounds 1-hydroxy-3-(1-hexenylazoxy)-2-butanone (I) and 1-acetyloxy-3-(1-hexenylazoxy)-2-butanone (II), which may be represented by the following structural formulae:

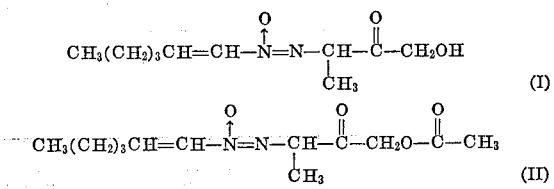

The invention includes within its scope the antifungal compounds in dilute forms, as crude concentrates, and in pure liquid form as well as methods of preparing the antifungal compounds. These novel compounds possess broad-spectrum antifungal activity in vitro against a variety of standard laboratory microorganisms.

DETAILED DESCRIPTION OF THE INVENTION

The new compound 1-hydroxy-3-(1-hexenylazoxy)-2-butanone (I) is formed during the cultivation under controlled aerobic conditions of a strain of *Streptomyces hinnulinus* n.s. This new antifungal-producing streptomycete was isolated from a sample of peat moss and soil. A viable culture of the organism has been deposited with the Culture Collection Laboratory, Northern Utilization Research and Development Division, United States Department of Agriculture, Peoria, Ill., and has been added to its permanent collection. It is freely available to the public in this depository under its accession number NRRL 3592.

The description and identification of this new microorganism, maintained in the culture collection of the Lederle Laboratories Division, American Cyanamid Company, of Pearl River, N.Y., was supplied by Dr. H. D. Tresner of these laboratories. The following is a general description of the organism *S. hinnulinus*, NRRL 3592, based on diagnostic characteristics observed. The underscored descriptive colors and color chip designations are taken from Jacobson et al., "Color Harmony Manual," 3rd ed. (1948), Container Corporation of America, Chicago, Ill.

Amount of growth

Moderate to good on most media; very light on Czapek's solution agar and light and restricted on inorganic salts-starch agar.

Aerial mycelium and/or en masse spore color

Aerial mycelium whitish; spore masses in grayish shades, ranging from Beige (3 ge) to Lt. Fawn (4 ge) to Fawn (4 ig). Sporulation light to good depending upon medium.

Soluble pigments

None on most media; yellowish and light on yeast extract and Kuster's oatflake agars.

Reverse color

In yellowish shades on most media.

Miscellaneous physiological reactions

Nitrates not reduced; complete liquefaction of gelatin in 7 days; melanoid pigments not produced on peptone-iron agar; tolerates up to 7% NaCl in growth medium. Carbon sources utilization, according to the Pridham and Gottlieb method [J. Bacteriol. 56, 107 (1948)], as follows: Fair to good utilization of l-arabinose, d-fructose, d-mannitol, d-trehalose, d-xylose and dextrose; poor or no utilization of adonitol, i-inositol, lactose, d-melezitose, d-melibiose, d-raffinose, l-rhamnose, salicin, and sucrose.

Micromorphology

Aerial mycelium giving rise to spore chains in the form of hooks, loops, coils and loose spirals. Spores subglobose to elliptical; variable in size, $0.5$–$0.6\mu \times 0.8$–$1.2\mu$. Spores smooth-walled as determined by electron microscopy at $8000\times$.

The general characteristics of NRRL 3592 place the organism in the genus Streptomyces. The range of spore color shades exhibited by the culture covers a wide span which overlaps between the "Gray" and "Red" series of the Tresner and Backus color system [Appl. Microbiol. 11, 335 (1963)]. When other diagnostic criteria such as its spiralled sporophores, smooth-walled spores and its lack of melanoid pigments are considered, relationship to certain streptomycetes within each of the two color series is suggested. However, comparative studies with actual reference specimens and published descriptions of these organisms failed to indicate any which were closely enough allied to be considered of the same species. Therefore, NRRL 3592 is proposed as a new species. The epithet *Streptomyces hinnulinus* sp. nov. has been given the culture to be descriptive of its fawn-color spores.

A critical examination of the cultural, physiological and morphological features of the organism was made when it was grown on several media; including those recommended by Pridham et al., Antibiotics (1956–1957), pp. 947–953. Detailed observations are recorded in Tables I, II, III and IV below. Underscored descriptive colors are taken from the "Color Harmony Manual."

TABLE I.—CULTURAL CHARACTERISTICS OF *STREPTOMYCES HINNULINUS* NRRL 3592

[Incubation: 14 days; Temperature: 28° C.]

| Medium | Amount of growth | Aerial mycelium and/or spores | Soluble pigment | Reverse color | Remarks |
|---|---|---|---|---|---|
| Czapek's solution agar | Very light | No aerial mycelium; thin colorless substrate growth. | None | Colorless | |
| Asparagine dextrose agar | Moderate | Aerial mycelium whitish, becoming beige (3 ge.) to light fawn (4 ge.) in sporulating areas. Sporulation moderate. | do | Bamboo (2 cc.) to light wheat (2 ea.). | |
| Hickey and Tresner's agar | do | Aerial mycelium whitish, becoming fawn, (4 ig.) to light fawn (4 eg.) in sporulating areas. Sporulation moderate. | do | Light wheat (2 wa.) | |
| Yeast extract agar | do | Aerial mycelium whitish, becoming, beige (3 ge.) to light fawn (4 ge.) in sporulating areas. Sporulation moderate. | Yellowish; light | Maize (2 hb.) | |
| Kuster's oatflake agar | Good | Aerial mycelium whitish, becoming beige (3 ge.) to light fawn (4 ge.) in sporulating areas. Sporulation good. | do | Wheat (2 ea.) to light amber (3 ic.). | Moderate starch hydrolysis. |
| Tomato paste oatmeal agar | do | Aerial mycelium whitish, becoming beige (3 ge.) to light fawn (4 ge.) in sporulating areas. Sporulation moderate. | None | Light amber (3 ic.) | |
| Potato dextrose agar | do | Aerial mycelium whitish, becoming beige (3 ge.) to light fawn (4 ge.) in sporulating areas. Sporulation good. | do | Wheat (2 ea.) to light tan (3 gc.) to chestnut brown (4 ni.). | Sectors of Cork tan (4 ie.) sporulation. Moderate starch hydrolysis. |
| Bennett's agar | Moderate | Aerial mycelium whitish, becoming beige (3 ge.) to light fawn (4 ge.) in sporulating areas. Sporulation moderate. | do | Light wheat (2 ea.) | |
| Inorganic salts starch agar | Light, restricted. | Aerial mycelium whitish, trade of grayish sporulation. | do | Pearl (3 ba.) | |

TABLE II.—MICROMORPHOLOGY OF *STREPTOMYCES HINNULINUS* NRRL 3592

| Medium | Aerial mycelium and/or sporiferous structures | Spore shape | Spore size | Spore surface |
|---|---|---|---|---|
| Kuster's oatflake, agar | Spore chains arising from aerial mycelium as hooks, loops, coils and loose spirals. | Subglobose to elliptical. Variable in size. | 0.5–0.6µ 0.8–1.2µ | Spore surface smooth as determined by electron microscopy at 8,000X. |

TABLE III.—MISCELLANEOUS PHYSIOLOGICAL REACTION OF *STREPTOMYCES HINNULINUS* NRRL 3592

[Temperature: 28° C.]

| Medium | Incubation period, days | Amount of growth | Physiological reaction |
|---|---|---|---|
| Organic nitrate broth | 7 | Good | Nitrates not reduced. |
| Do | 14 | do | Do. |
| Gelatin | 7 | do | Complete liquefaction. |
| Do | 14 | do | Do. |
| Peptone-iron agar | [1] 24 | do | Melanoid pigments not formed. |
| 4–13% NaCl in yeast extract agar. | 10 | | Tolerates a maximum of 7% NaCl in growth medium. |

[1] Hours.

TABLE IV

Carbon source utilization pattern of *Streptomyces hinnulinus* NRRL 3592

[Incubation: 10 days; temperature: 28° C.]

| Carbon source: | Utilization [1] |
|---|---|
| Adonitol | 0 |
| l-Arabinose | 3 |
| d-Fructose | 3 |
| i-Inositol | 0 |
| Lactose | 1 |
| d-Mannitol | 3 |
| d-Melezitose | 0 |
| d-Melibiose | 0 |
| d-Raffinose | 0 |
| l-Rhamnose | 0 |
| Salicin | 0 |
| Sucrose | 0 |
| d-Trehalose | 2 |
| d-Xylose | 3 |
| Dextrose | 3 |
| Negative control | 0 |

[1] See following table:

| | Utilization |
|---|---|
| 3 | Good. |
| 2 | Fair. |
| 1 | Poor. |
| 0 | None. |

It is to be understood that for the production of the new antifungal agent 1-hydroxy-3-(1-hexenylazoxy)-2-butanone (I) the present invention is not limited to this particular organisms only, nor to organisms fully answering the above growth and microscopic characteristics which are given for illustrative purposes. In fact, it is desired and intended to include the use of mutants produced from the described organism by various means such as X-radiation, ultraviolet radiation, nitrogen mustard, phage exposure, and the like.

The fermentation process

Cultivation of the organism *S. hinnulinus*, NRRL 3592, may be carried out in a wide variety of liquid culture media. Media which are useful for the production of the novel antifungal include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chloride, etc. Trace elements such as boron, molybdenum, copper, etc., are supplied as impurities of other constituents of the media. Aeration in tanks and bottles is provided by forcing sterile air through or onto the surface of the fermenting medium. Agitation in tanks is provided by a mechanical impeller. An antifoaming agent, such as lard oil may be added as needed.

Inoculum preparation

Shaker flask "seed" inoculum of *S. hinnulinus* is prepared by inoculating 100 milliliter portions of sterile liquid medium in 500 milliliter flasks with scrapings or washings of spores from an agar slant of the culture. The following medium is ordinarily used.

| | Grams |
|---|---|
| Glucose | 20 |
| Soy bean flour | 10 |
| Corn steep liquor | 5 |
| Calcium carbonate | 3 |

Water to 1,000 milliliters.

The flasks are incubated at a temperature of 25°–29° C., preferably 28° C., and agitated moderately on a rotary shaker for 30 to 48 hours. These 100 milliliter portions of seed inoculum are used to inoculate twelve liters of the same medium in 20 liter glass fermentors. The inoculum mash is aerated with sterile air while growth is continued for 36 to 48 hours. The inoculum mash is used to inoculate tank fermentors.

Tank fermentation

For the production of the antifungal in tank fermentors the following medium is preferably used.

| | Grams |
|---|---|
| Molasses | 20 |
| Glucose | 10 |
| Bacto-Peptone | 5 |

Water to 1,000 milliliters.
(pH is adjusted to 7.3 with 10 N sodium hydroxide.)

Each tank containing the above sterilized medium is inoculated with 3 to 8 percent of second stage inoculum made as described above. Aeration is supplied at 0.3 to 1.0 liter of sterile air per liter of broth per minute and the fermenting mixture is agitated by an impeller driven at 200–400 r.p.m. The temperature is maintained at 25°–29° C., usually at 28° C. Hodag LG–8 oil is ordinarily used as a defoaming agent if necessary. The fermentation is ordinarily continued for 24 to 48 hours, at which time the mash is harvested. If fermentation is prolonged, activity is greatly diminished. Loss of antifungal activity during holding periods can be minimized by chilling the mash to 18°–20° C. and by allowing the air supply to play upon the mash surface instead of using direct aeration.

Isolation procedure

After the fermentation is completed, the fermented mash containing the 1-hydroxy-3-(1-hexenylazoxy)-2-butanone is filtered, preferably with the addition of diatomaceous earth or other conventional filter aid. Normally, the mycelial filter cake is washed with a small portion of water, and the water wash is combined with the filtrate. The combined filtrate and wash is extracted with chloroform using about 300 to 350 milliliters of solvent per liter of filtrate. Other solvents, for example, ethyl acetate and methylene chloride may be used in place of chloroform. The chloroform extract is concentrated under reduced pressure to a small volume, dried over anhydrous magnesium sulfate and then further concentrated under reduced pressure to a black mobile oil. The temperature is not allowed to exceed 30°–35° C. Ordinarily, yields of the black oil vary from about 15 grams to 35 grams per 300 liters of fermentor mash. Concentrations of 200 micrograms per milliliter of these oils typically give zones of inhibition of 33 to 37 millimeters against *Paecilomyces varioti* using the agar plate diffusion method. These oils can be stored under nitrogen at −15° C. for periods of up to six months without significant loss of antifungal activity.

The dark oil is purified by adsorption chromatography over neutral silica gel and elution with such solvent mixtures as chloroform-hexane or hexane-ethyl acetate. Appropriate fractions of eluent containing antifungal activity, as determined by agar plate diffusion assay against *Paecilomyces varioti* or *Candida albicans*, are combined and concentrated to a light yellow, mobile oil. Optionally, activity can be monitored using ultraviolet spectroscopy at 237 m$\mu$ or by thin layer chromatography on silica gel, $R_f$=0.7–0.8 when developed in the system hexane:ethyl acetate (60:40). The dark oil also may be purified by partition chromatography over diatomaceous earth using the partition system consisting of hexane: ethyl acetate:methanol: water (90:10:15:6). With this system the antifungal agent is eluted in the second and third hold-back volumes.

A yellow oil is obtained on evaporation of the solvents from appropriate fractions.

Further purification of the 1-hydroxy-3-(1-hexenylazoxy)-2-butanone obtained from either the adsorption or partition chromatography procedures may be carried out by dissolving the yellow oil in hexane and decolorizing the solution with charcoal. Subsequent evaporation of the hexane solution yields the purified antifungal, 1-hydroxy-3-(1-hexenylazoxy)-2-butanone, as a light yellow, mobile oil.

The antifungal agent 1-hydroxy-3-(1-hexenylazoxy)-2-butanone can be distilled across a short path-length onto a cold-finger at temperatures not exceeding 35° C. at from 5 to 10$\mu$ of pressure. In the mass spectrum the molecular ion peak at m/e=214 is very weak. A major abundant peak occurs at m/e=198 which arises due to the facile loss of oxygen from the azoxy group. The compound has the optical rotation $[\alpha]_D^{25}$+153°±1.7 (c.=1.73 methanol), and exhibits a maximum absorption in the ultraviolet range in methanol; $\lambda_{max}$ 238 m$\mu$ ($\epsilon$ 9,000). The compound is relatively unstable and begins to decompose almost immediately in the light at room temperature and within one week is approximately 50% decomposed into the following compound:

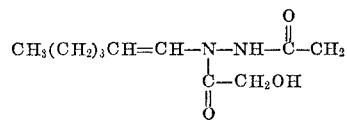

Mild refluxing of 1-hydroxy-3-(1-hexenylazoxy)-2-butanone in methanol in the presence of potassium bicarbonate for a period of a few minutes results in a 70–90% conversion into the above degradation compound.

The 1-hydroxy-3-(1-hexenylazoxy)-2-butanone (I) and 1-acetyloxy-3-(1-hexenylazoxy)-2-butanone (II) of the present invention are potent antifungal agents and possess broad-spectrum antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of fungal growth is noted. Appropriate calibration of these observations permits the quantitative calculation of the minimal inhibitory concentration (expressed in micrograms per milliliter) causing complete inhibition of growth for each test compound.

The minimal inhibitory concentrations of 1-hydroxy-3-(1-hexenylazoxy)-2-butanone (I) and of 1-acetyloxy-3-(1-hexenylazoxy)-2-butanone (II) against various test organisms as determined in the above-described assay are set forth in Table V below:

TABLE V

| Fungal culture | Minimal inhibitory concentration. mcg./ml. | |
| --- | --- | --- |
| | (I) | (II) |
| Candida albicans E 83 | 31.0 | 50.0 |
| Cryptococcus neoformans E 138 | 1.5 | 5.0 |
| Trichophyton tonsurans NIH 662 | 1.5 | 2.0 |
| Trichophyton rubrum E 97 | 3.1 | 2.0 |
| Trichophyton mentagrophytes E 11 | 1.5 | 5.0 |
| Microsporum canis ATCC 10214 | 3.1 | 1.0 |
| Microsporum gypseum ATCC 14683 | 6.2 | 5.0 |
| Philaophora jeanselmei ATCC 10224 | 6.2 | 20.0 |

The invention will be described in greater detail in conjunction with the following specific examples.

EXAMPLE 1

Inoculum preparation

"Seed" inoculum for inoculating tank fermentors is prepared in two stages.

First Stage.—The spores from an agar slant of culture S. hinnulinus, NRRL 3592, are scraped into two 500 milliliter flasks each containing 100 milliliters of sterile liquid medium. The following medium is ordinarily used.

| | Grams |
| --- | --- |
| Glucose | 20 |
| Soybean flour | 10 |
| Corn steep liquor | 5 |
| Calcium carbonate | 3 |

Water to 1,000 milliliters.

The flasks are placed on a rotary shaker (150 r.p.m.) and growth is allowed to continue for about 48 hours at a temperature of 28° C.

Second stage.—Two hundred milliliters of inoculum from the first stage are added to 12 liters of the above sterile medium contained in a 20-liter bottle. The bottle is incubated at a temperature of about 28° C. for about 48 hours. The inoculum mash is aerated with sterile air. The inoculum so obtained is used to inoculate tank fermentors.

EXAMPLE 2

Tank fermentation

A fermentation medium is prepared according to the following formula:

| | Grams |
| --- | --- |
| Molasses | 20 |
| Glucose | 10 |
| Bacto Peptone | 5 |

Water to 1,000 milliliters.
(pH is adjusted to 7.3 with 10 N sodium hydroxide.)

Three hundred liters of the above medium is sterilized with steam pressure at 120° C. for 60 minutes. After cooling to 28° C., the fermentor is inoculated with twelve liters of inoculum, prepared as described in Example 1. The fermentation mash is aerated at the rate of 0.5 liter of sterile air per liter of mash per minute and agitated at 200 r.p.m. The temperature is maintained at 28° C. and Hodag LG-8 oil is used as defoaming agent. The activity of the antifungal in the mash is followed by agar-diffusion cylinder plate assay against P. varioti. The fermentation is harvested 30 hours after inoculation. At harvest time, the mash filtrate produces a zone of inhibition of 33 millimeters.

EXAMPLE 3

Isolation of 1-hydroxy-3-(1-hexenylazoxy)-2-butanone

Two hundred and ninety liters of fermented mash, obtained as described in Example 2, is filtered using diatomaceous earth as filter aid in the proportion 3% weight per volume. The filtrate is extracted with two portions of chloroform using one-third volume of chloroform to one volume of filtrate. The chloroform extracts are combined and evaporated under reduced pressure at 30°–35° C. to volume of about three liters. The concentrate is dried over magnesium sulfate, and following removal of the salt by filtration, evaporation of the concentrate under the above conditions is continued until a mobile dark oil is obtained (weight 17.5 g.).

Purification of the dark oil is carried out using column chromatography. About 200 g. of acid-washed diatomaceous earth is equilibrated with 100 ml. of the lower phase of the solvent system n-hexene:ethyl acetate:methanol:water (90:10:15:6) and packed into a column (I.D. 1⅜ inches). A 6.0 g. portion of the dark oil is dissolved in 10 ml. of the lower phase. About 20 g. of diatomaceous earth is added to the solution and the mixture is charged onto the column. The column is developed using the upper phase of the solvent system while monitoring the effluent with ultraviolet light at 238 mμ. The active material, eluted in the second and third hold-back volumes, is recovered following evaporation of the solvent under reduced pressure (1.2 g. of mobile yellow oil). Further purification is effected by dissolving the oil in about 50 ml. of hexane and decolorizing with 150 to 200 mg. of Darco G–60. Essentially pure product, as shown by thin layer chromatography, is obtained on removal of the charcoal and evaporation of the solvent under reduced pressure. [Thin layer chromatography of the purified oil on partially deactivated silica gel using the developing system hexane: ethyl acetate (60:40) shows it to be a single entity, $R_f=0.7$.]

EXAMPLE 4

Preparation of 1-acetyloxy-3-(1-hexenylazoxy)-2-butanone

About 428 mg. (2 mmole) of 1-hydroxy-3-(1-hexenylazoxy)-2-butanone is dissolved in 5 ml. of acetic anhydride and 60 mg. of anhydrous sodium acetate is added to the solution. The reaction mixture is kept in the dark at room temperature for at least 2 hours. At the end of this period the solvent is evaporated under reduced pressure at 30°–35° C., and the resultant oil-solid suspension is treated with toluene. The hydrated sodium acetate is removed by filtration and the filtrate is evaporated under reduced pressure to an oil. The oil is purified by chromatography using 20 g. of silica gel (Davidson, Grade 922) with 5% ethyl acetate in hexane as the eluting solvent. The product is recovered as a light yellow oil from the second and third hold-back volumes upon evaporation of the solvent. For further purification the oil is taken up in a small volume of hexane and the solution is treated with 1 to 2% (w./w.) of Darco G–60. The suspension is filtered and the acetyl derivative is recovered by evaporation of the hexane under reduced pressure. (The yield of the acetyl derivative, prepared as described, is normally about 60 percent.) Optical rotation $[\alpha]_D^{25}$ +143°±3.3 (c.=0.918 methanol). Ultraviolet maximum, $\lambda_{max}$. 239 mμ (ε 7,500) methanol. Molecular ion by mass spectroscopy given by mil/e=256.

We claim:

1. The compound 1-hydroxy-3-(1-hexenylazoxy)-2-butanone represented by the formula:

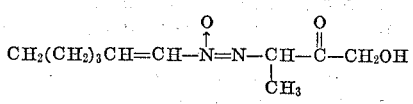

2. The compound 1-acetyloxy-3-(1-hexenylazoxy)-2-butanone represented by the formula:

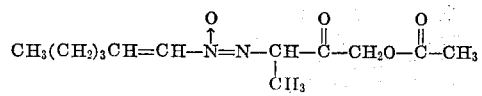

(References on following page)

References Cited

Mortimer, J. Org. Chem., vol. 30, pp. 1632–1634 (1965).

Moss et al., Tetrahedron Letters, No. 44, pp. 3897–3899 (1969).

Stevens et al., J. Am. Chem. Soc., vol. 80, pp. 6088 to 6092 (1958).

Aston et al., J. Am. Chem. Soc., vol. 54, pp. 1530–1538 (1932).

Aston et al., J. Am. Chem. Soc., vol. 56, pp. 1387–1388 (1934).

Aston et al., J. Am. Chem. Soc., vol. 60, pp. 1930–1935 (1938).

Aston et al., Nature, vol. 167, pp. 863–864 (1951).

Gillis et al., J. Org. Chem., vol. 32, pp. 95–96 (1967).

Iffland et al., J. Am. Chem. Soc., vol. 83, pp. 747–749 (1961).

FLOYD DALE HIGEL, Primary Examiner

U.S. Cl. X.R.

195—27, 53, 80; 424—115, 226

UNITED STATES PATENT OFFICE
CERTIFICATE OF CORRECTION

Patent No. 3,647,776      Dated March 7, 1972

Inventor(s) William James McGahren, John Norman Porter, and Joseph Daniel Korshalla It is certified that error appears in the above-identified patent and that said Letters Patent are hereby corrected as shown below:

In Table I under Aerial Mycelium and/or spores the last entry "trade" should be -- trace --.

Table II under Spore Size "0.5-0.6µ 0.8-1.2µ" should read
-- 0.5-0.6µ
      X
 0.8-1.2µ --.

Column 6, lines 25-35 should read as follows instead of as in the patent --

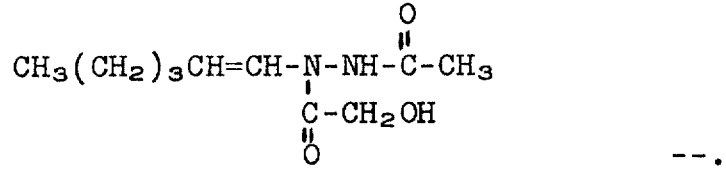

--.

Column 8, line 58, "mil/e = 256." should read -- m/e = 256. --

Column 8, Claim 1, the formula therein should be as follows:

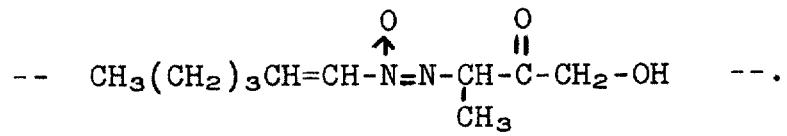

--.

Signed and sealed this 1st day of August 1972.

(SEAL)
Attest:

EDWARD M. FLETCHER, JR.      ROBERT GOTTSCHALK
Attesting Officer      Commissioner of Patents